United States Patent
Rossmann et al.

(10) Patent No.: US 7,991,807 B2
(45) Date of Patent: Aug. 2, 2011

(54) METHOD AND SYSTEM FOR GARBAGE COLLECTION

(75) Inventors: Albert Rossmann, Wiesloch (DE); Stefan Schulz, Neu-Isenburg (DE)

(73) Assignee: SAP AG, Walldorf (DE)

( * ) Notice: Subject to any disclaimer, the term of this patent is extended or adjusted under 35 U.S.C. 154(b) by 367 days.

(21) Appl. No.: 11/943,584

(22) Filed: Nov. 21, 2007

(65) Prior Publication Data
US 2009/0132622 A1     May 21, 2009

(51) Int. Cl.
G06F 12/00 (2006.01)
G06F 17/30 (2006.01)
G06F 7/00 (2006.01)

(52) U.S. Cl. ........ 707/813; 707/814; 707/816; 707/818; 707/820

(58) Field of Classification Search .......... None
See application file for complete search history.

(56) References Cited

U.S. PATENT DOCUMENTS

| | | | |
|---|---|---|---|
| 6,279,148 B1 * | 8/2001 | Taivalsaari et al. | 717/114 |
| 7,424,499 B2 * | 9/2008 | Lomet | 1/1 |
| 2002/0103819 A1 * | 8/2002 | Duvillier et al. | 707/206 |
| 2006/0155791 A1 * | 7/2006 | Tene et al. | 707/206 |

* cited by examiner

Primary Examiner — Jay A Morrison
Assistant Examiner — Sangwoo Ahn

(57) ABSTRACT

A method and system for garbage collection are provided. A memory allocation request is received for an object. An object identifier is generated for the object. A first memory location is allocated to the object. A translation table is generated storing a map of the object identifier and the first memory location. A data structure is generated for the object. A mark flag is set based on the number of references of the object. Data stored in the first memory location is moved to a second memory location based upon the value of the mark flag. The data is deleted from the first memory location based upon a value of the mark flag.

18 Claims, 5 Drawing Sheets

METHOD AND SYSTEM FOR GARBAGE COLLECTION

TECHNICAL FIELD

Embodiments of the invention generally relate to computer systems, and more particularly to a method and system for garbage collection.

BACKGROUND

In computer science, memory management is the act of managing computer memory. In its simpler forms, this involves providing ways to allocate portions of memory to programs at their request, and freeing it for reuse when no longer needed. Garbage collection (GC) is a form of automatic memory management. The garbage collector or collector attempts to reclaim garbage, or memory used by objects that will never be accessed or mutated again by the application. Garbage collection is the process of automatically freeing objects that are no longer referenced by the program. This frees the programmer from having to keep track of when to free allocated memory, thereby preventing many potential bugs and headaches. The name "garbage collection" implies that objects that are no longer needed by the program are "garbage" and can be thrown away. A more accurate and up-to-date metaphor might be "memory recycling." When an object is no longer referenced by the program, the heap space it occupies must be recycled so that the space is available for subsequent new objects. The garbage collector must somehow determine which objects are no longer referenced by the program and make available the heap space occupied by such unreferenced objects.

Any garbage collection algorithm must do two basic things. First, it must detect garbage objects. Second, it must reclaim the heap space used by the garbage objects and make it available to the program. Garbage detection is ordinarily accomplished by defining a set of roots and determining reachability from the roots. An object is reachable if there is some path of references from the roots by which the executing program can access the object. The roots are always accessible to the program. Any objects that are reachable from the roots are considered live. Objects that are not reachable are considered garbage, because they can no longer affect the future course of program execution.

The current garbage collection algorithms have many disadvantages. The garbage collection is closely related to the programming language, which inhibits a reuse of a common runtime. The garbage collection extends a programming language to a runtime environment and replaces a huge part of features, which are already implemented by the operating system. In addition, the existing garbage collection is decoupled from the memory management of the operating system that makes the use of existing monitoring, profiling, debugging and administration tools impossible. Furthermore, current garbage collection is unpredictable at start and runtime. Thus the current garbage collection algorithms are performance bottlenecks and make CPU (Central Processing Unit) response times unpredictable.

SUMMARY OF THE INVENTION

Embodiments of the invention are generally directed to a method and system for garbage collection. A memory allocation request is received for an object. An object identifier is generated for the object. A first memory location is allocated to the object. A translation table is generated storing a map of the object identifier and the first memory location. A data structure is generated for the object. A mark flag is set based on the number of references of the object. Data stored in the first memory location is moved to a second memory location based upon a value of the mark flag. The data is deleted from the first memory location based upon a value of the mark flag.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for garbage collection. A memory allocation request is received for an object. An object identifier is generated for the object. A first memory location is allocated to the object. A translation table is generated storing a map of the object identifier and the first memory location. A data structure is generated for the object. A mark flag is set based on the number of references of the object. Data stored in the first memory location is moved to a second memory location based upon the value of the mark flag. The data is deleted from the first memory location based upon a value of the mark flag.

Figure 1:
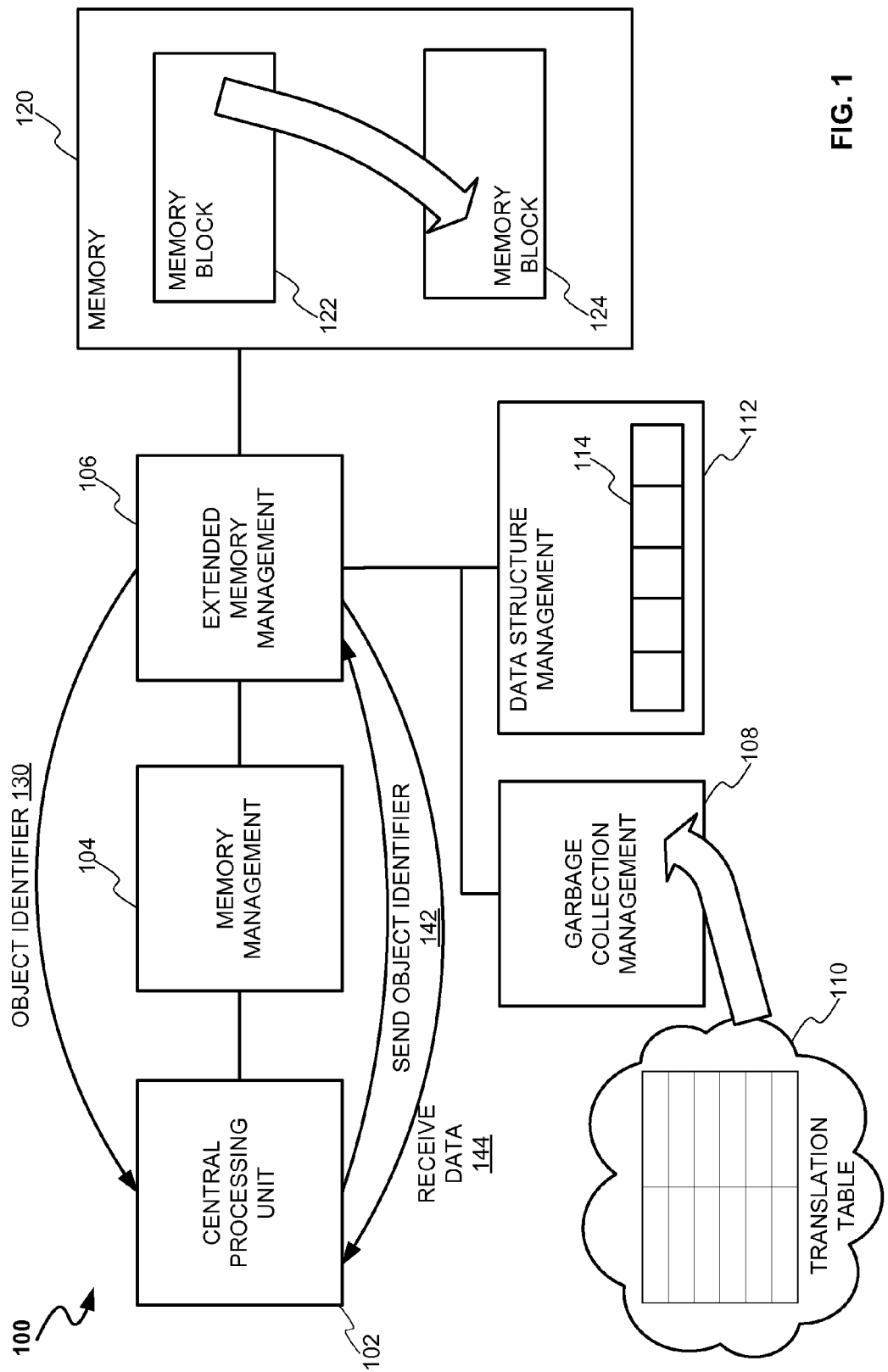
FIG. 1 is a functional block diagram of a system for garbage collection according to an embodiment of the invention.

FIG. 1 is a functional block diagram of a system 100 for garbage collection according to an embodiment of the invention. During an object generation phase, central processing unit (CPU) 102 sends a memory allocation request to memory management 104 for allocation of an amount of memory in memory unit 120 to an object typically for use in a computer program. Memory management 104 is generally responsible for allocation of the memory to objects. The amount of memory allocated to the object is generally determined by the computer program at the time of allocation and need not be known in advance. Memory unit 120 is typically divided in to one or more memory blocks 122 and 124. According to an embodiment, memory allocation is typically allowed only in one of the memory blocks 122 and 124 available in memory unit 120. Allocation of the memory typically includes allocation of a set of memory locations in memory unit 120. The number of memory locations allocated to an object is decided by memory management 104 based upon the request received from CPU 102. In an embodiment, memory unit 120 is a physical address space. Physical address space may include any physical memory such as a random access memory (RAM). CPU 102 typically requests for the memory by way of virtual addresses. It is the responsibility of memory management 104 to allocate physical memory in memory unit 120 and perform translations from virtual addresses to physical addresses on each access to the memory locations allocated in memory unit 120. A virtual address is typically an address identifying a virtual (non-physical) entity.

The memory allocation requests are typically forwarded by memory management 104 to extended memory management 106. Extended memory management 106 generates a unique object identifier for each object that is allocated an amount of memory in memory unit 120. In an embodiment, the object identifiers generated for objects are stored in a separate identifier address space (not shown). The identifier address space may reside either in memory unit 120 or in extended memory management 106. In an embodiment the identifier address space is not directly accessible by either CPU 102 or memory management 104 to prevent potential allocation of memory and overwriting in the identifier address space. On receipt of a memory allocation request for an object from CPU 102, extended memory management 106 typically generates an object identifier for the object and sends 130 the object identifier back to CPU 102. Subsequent requests for access to the memory allocated to the object are made by CPU 102 by providing the object identifier of the object to extended memory management 106.

Garbage collection management 108 generates a translation table 110 for storing the object identifiers of the objects and the corresponding memory locations allocated in memory unit 120 to each of the objects. A request for access to the memory locations of an object is generally made by CPU 102 by sending 142 the object identifier of the object to extended memory management 106. Extended memory management 106 looks up translation table 110 for the corresponding addresses of the memory locations allocated to the object, extracts the required data from the memory locations and sends 144 the data back to CPU 102. Translation table 110 may either be stored in garbage collection management 108 or in memory unit 120.

Data structure management 112 typically generates data structure 114 for each object that has memory allocated in memory unit 120. Data structure 114 generally has various fields including a length field, a number field, an address field and a mark flag. The length field stores a length of the memory allocated to an object. The length field typically includes the number of memory locations allocated to the object in memory unit 120. The number field stores a number of references that the object makes to other objects. A zero value in the number field indicates that the object has no references to any other objects. The address field typically stores the addresses of the other objects in memory unit 120 referenced by the object. The mark flag may either be set to one or unset to zero. Data structure 114 may either be stored in data structure management 112 or memory unit 120.

In an embodiment memory unit 120 includes memory block 122 and memory block 124. Memory block 122 is typically used exclusively for memory allocation to objects. Memory block 124 is strictly not used for memory allocation to objects. In a garbage collection cycle, garbage collection management 108 initiates a garbage collection in memory unit 120. Garbage collection is typically initiated by garbage collection management 108 when memory block 122 is fully allocated for various objects and no more memory space is left for further allocation to objects. Upon initiation of garbage collection, garbage collection management 108, in a mark cycle reads data structure 114 of each object that has memory allocated in memory block 122. The mark flag of data structure 114 is unset to zero if the number field of data structure 114 of an object is zero and the mark flag of data structure 114 is set to one if the number field of data structure 114 of the object is greater than zero. In an embodiment, garbage collection management 108 reads data structure 114 of the objects starting from a first object listed in translation table 110 till a last object listed in translation table 110.

On setting or unsetting the mark flag of an object, garbage collection management 108, in a sweep cycle, typically reads the length field of data structure 114 of the object to find out the number of memory locations allocated to the object starting from the first memory location allocated to the object. If the mark flag in data structure 114 of the object is set to one, the data stored in all the memory locations allocated to the object is moved to memory block 124. Translation table 110 is subsequently updated with the addresses of the new memory locations allocated to the object in memory block 124. If the mark flag of data structure 114 of the object is unset to zero, the data stored in all the memory locations allocated for the object is deleted from memory block 122. The address space left vacant in memory block 124 upon deletion of the object is made available to memory management 104 for further allocation to new objects. In an embodiment, garbage collection management starts a sweep cycle for the objects only after a mark cycle for all the objects is finished.

Figure 2:
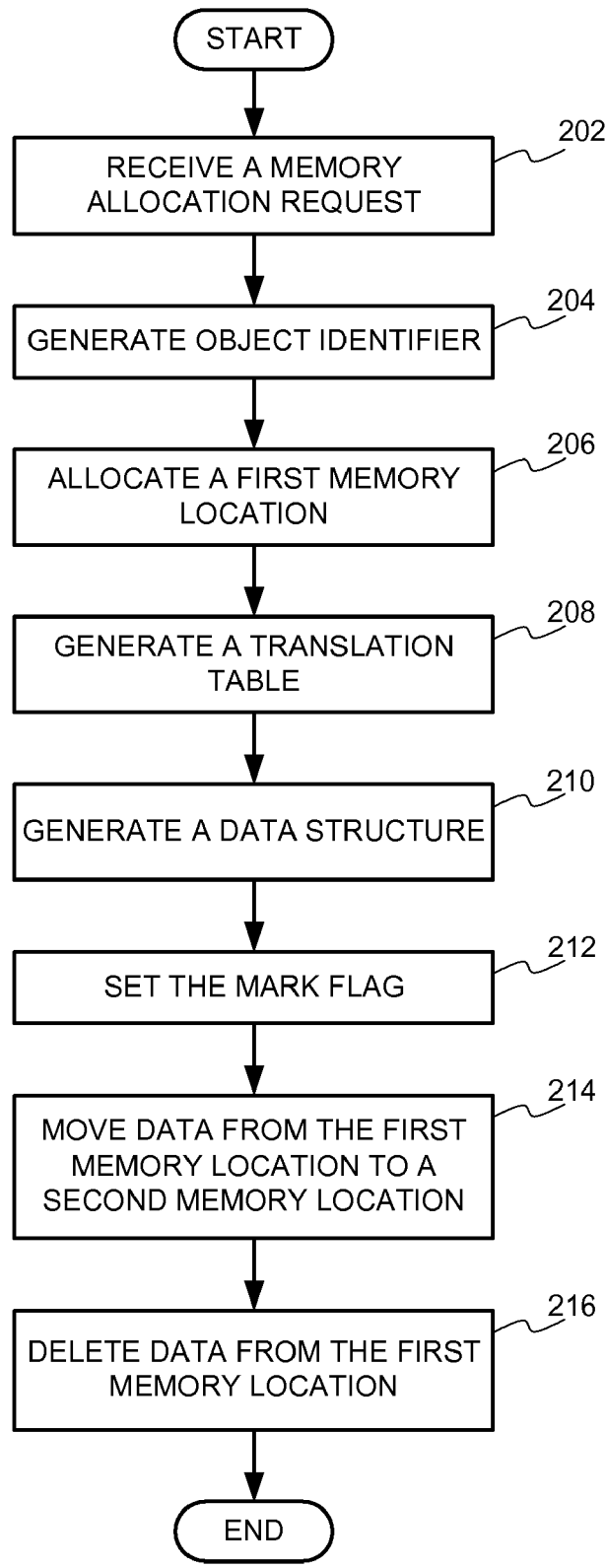
FIG. 2 is a flow diagram of a process for garbage collection according to an embodiment of the invention.

FIG. 2 is a flow diagram of a process for garbage collection according to an embodiment of the invention. In process block 202 a memory allocation request is received typically from a CPU for allocation of an amount of memory to an object in a memory unit. In process block 204, an object identifier is generated for the object. In process block 206, a first memory location is allocated to the object. In process block 208, a translation table is generated for storing a map of the object identifier and the first memory location. In process block 210, a data structure is generated for the object. The data structure typically includes a length field, a number field, an address field and a mark flag. In process block 212, a mark flag is set based on a number of references in the number field. In process block 214, data stored in the first memory location is moved to a second memory location based upon the value of the mark flag. In process block 216, data stored in the first memory location is deleted based upon the value of the mark flag.

Figure 3:
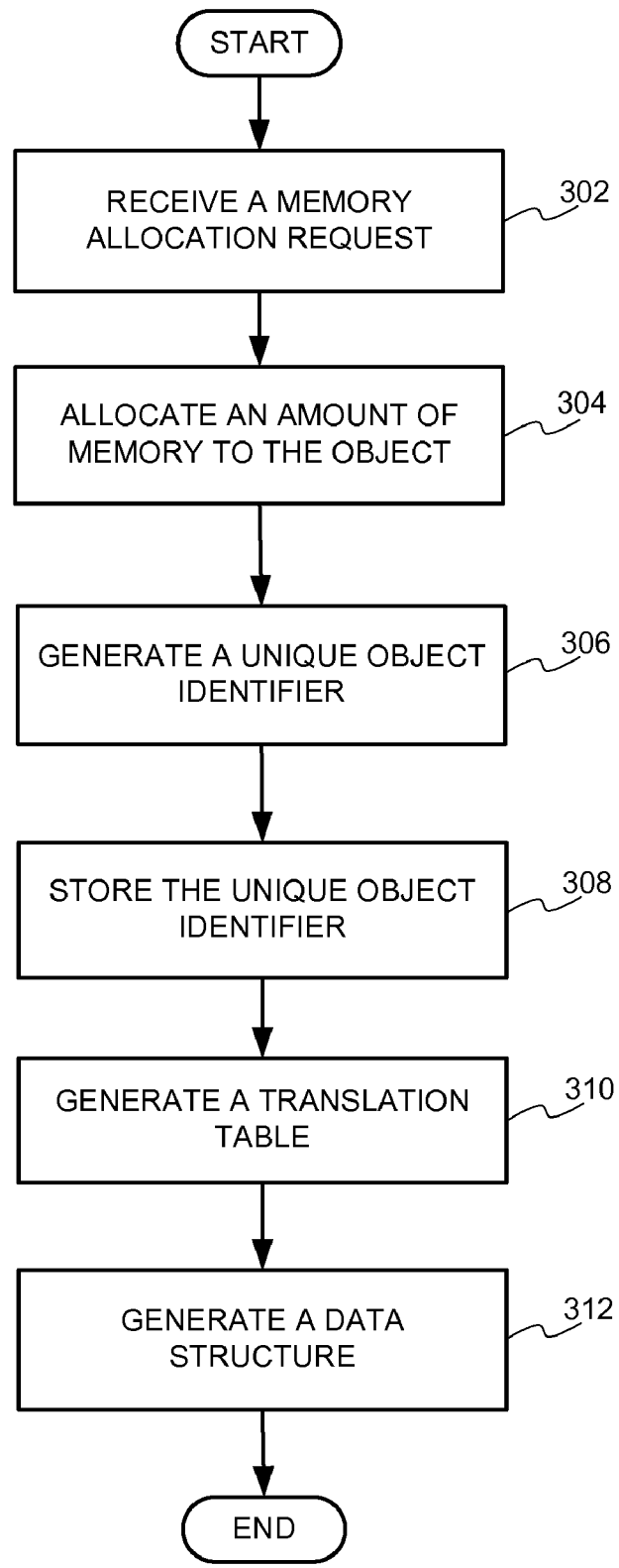
FIG. 3 is a flow diagram of a process for generating an object according to an embodiment of the invention.

FIG. 3 is a flow diagram of a process for generating an object according to an embodiment of the invention. In process block 302, a memory allocation request is received typically by a memory management module. The memory allocation request is generally sent by a central processing unit (CPU) to the memory management module for allocation of an amount of memory to an object in a memory unit typically for use in a computer program. In process block 304, an amount of memory is allocated to the object. The memory management module is generally responsible for allocation of the memory to objects. Allocation of the memory typically includes allocation of a set of memory locations in the memory unit. The number of memory locations allocated to an object is typically decided by the memory management module based upon the request received from the CPU. In process block 308, a unique object identifier is generated for the object. The memory allocation requests are typically forwarded by the memory management module to an extended memory management module. The unique object identifier is generated by the extended memory management module for each object that is allocated an amount of memory in the memory unit. In process block 306, the unique object identifier generated for the object is stored typically in a separate identifier address space. On receipt of a memory allocation request for an object from the CPU, the extended memory management module typically generates the object identifier for the object and sends the object identifier back to the CPU. Subsequent requests for access to the memory allocated to the object are made by the CPU by providing the object identifier of the object.

In process block 310, a translation table is generated typically by a garbage collection management module for storing the object identifiers of the objects and the corresponding memory locations allocated to each of the objects in the memory unit. A request for access to the memory locations of an object is generally made by the CPU by sending the object identifier of the object to the extended memory management module. Extended memory management typically looks up the translation table for the corresponding addresses of the memory locations allocated to the object, extracts the required data from the memory locations and sends the data back to the CPU.

In process block 312, a data structure is generated for the object. The data structure generally has various fields including a length field, a number field, an address field and a mark flag. The length field includes a length of the memory allocated to an object. The length field typically includes the number of memory locations allocated to the object in the memory unit. The number field generally includes a number of references that the object makes to other objects. A zero value in the number field indicates that the object has no references to any other objects. The address field typically includes the addresses of other objects in the memory unit referenced by the object. The mark flag may either be set to zero or one.

Figure 4:
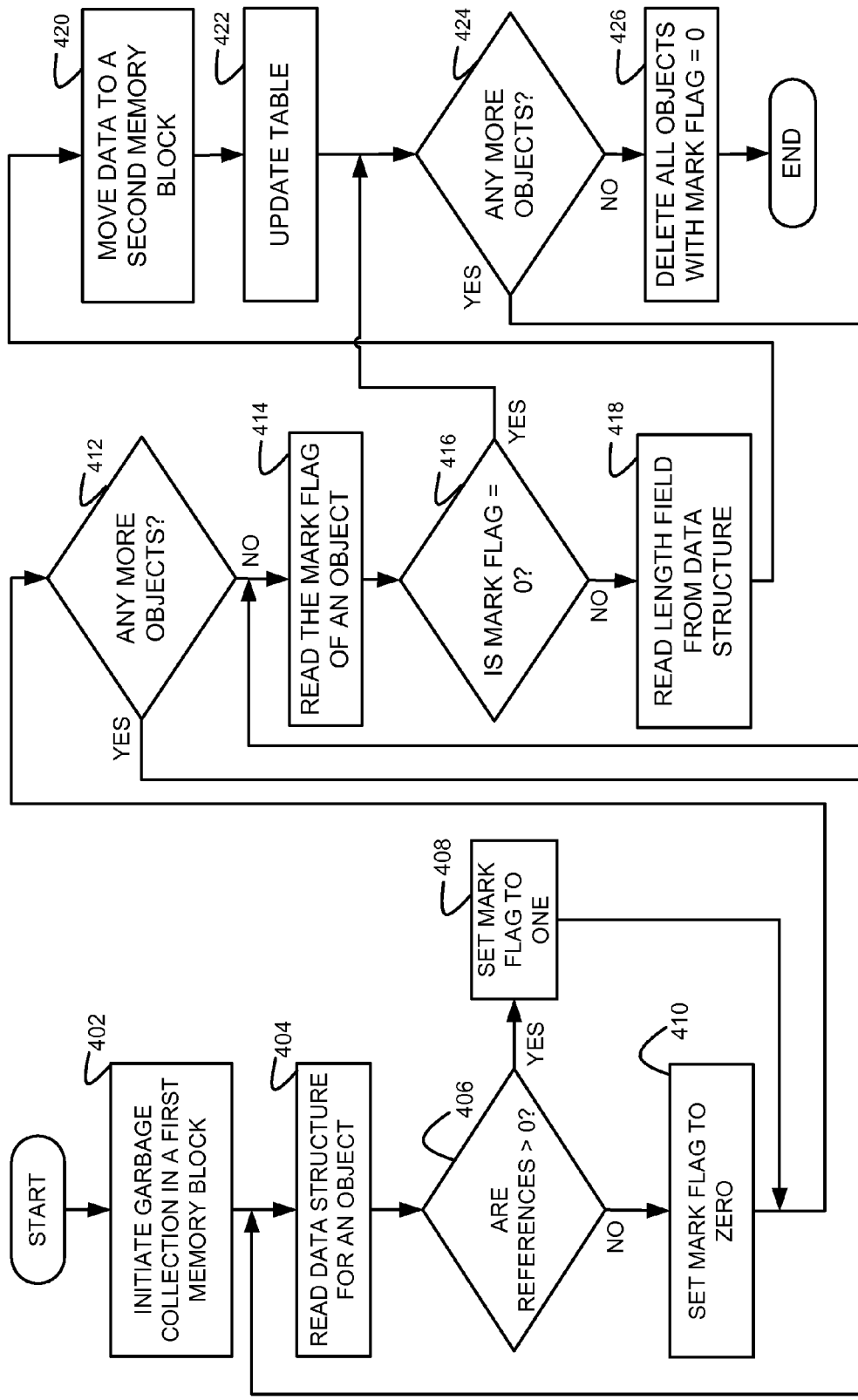
FIG. 4 is a flow diagram of a process for garbage collection according to an embodiment of the invention.

FIG. 4 is a flow diagram of a process for garbage collection according to an embodiment of the invention. In process block 402, a garbage collection is initiated in a first memory block of a memory unit. The garbage collection is initiated typically when the first memory block being used for allocation of memory is full and does not have any space left for further allocation of memory to objects. In process block 404, the data structure of an object in the memory unit is read. In an embodiment, the data structures of objects are read in a sequence starting from a first data object in a translation table to the last data object in a translation table. The data structure generally has various fields including a length field, a number field, an address field and a mark flag. In decision block 406, if the number of references of the object in the number field of the data structure is greater than zero the process proceeds to process block 408 where the mark flag is set to one. The process proceeds from process block 408 to decision block 412. In decision block 406, if the number of references is not greater than zero, the process proceeds to process block 410 where the mark flag is set to zero. In an embodiment, the mark flags of the objects are set in a mark cycle. In decision block 412, if there are any more objects left whose data structures have not been read and the mark flags not set, the process goes back to process block 404. In decision block 412, there are no objects left, the process proceeds to process block 414 where the mark flag is read from the data structure of the object. In an embodiment the mark flags are typically read in a sweep cycle starting from a first object in the translation table to the last object in the translation table.

After reading the mark flag of an object in process block 414, the process proceeds to decision block 416. In decision block 416, if the mark flag of the object equals zero, the process proceeds to decision block 424. In decision block 416, if the mark flag is not equal to zero, the process proceeds to process block 418 where the length field is read from the data structure of the object. The length field typically includes the number of memory locations allocated to the object in the first memory block starting from the first memory location allocated to the object. In process block 420, data stored in the memory locations allocated to the object is moved to a second memory block. In process block 422, the translation table is updated with the new address of the object in the second memory block. In decision block 424 if there are any objects left whose mark flag have not been read, the process goes back to process block 414 where the mark flag of another object (typically the next object in sequence in the translation table) is read. In decision block 424, if there are no more objects left whose mark flag has not been read, the process proceeds to process block 426 where all objects with mark flag set to zero are deleted from the first memory block. The vacant memory in the first memory block upon deletion of the objects is then made available for allocation of memory to other objects.

Figure 5:
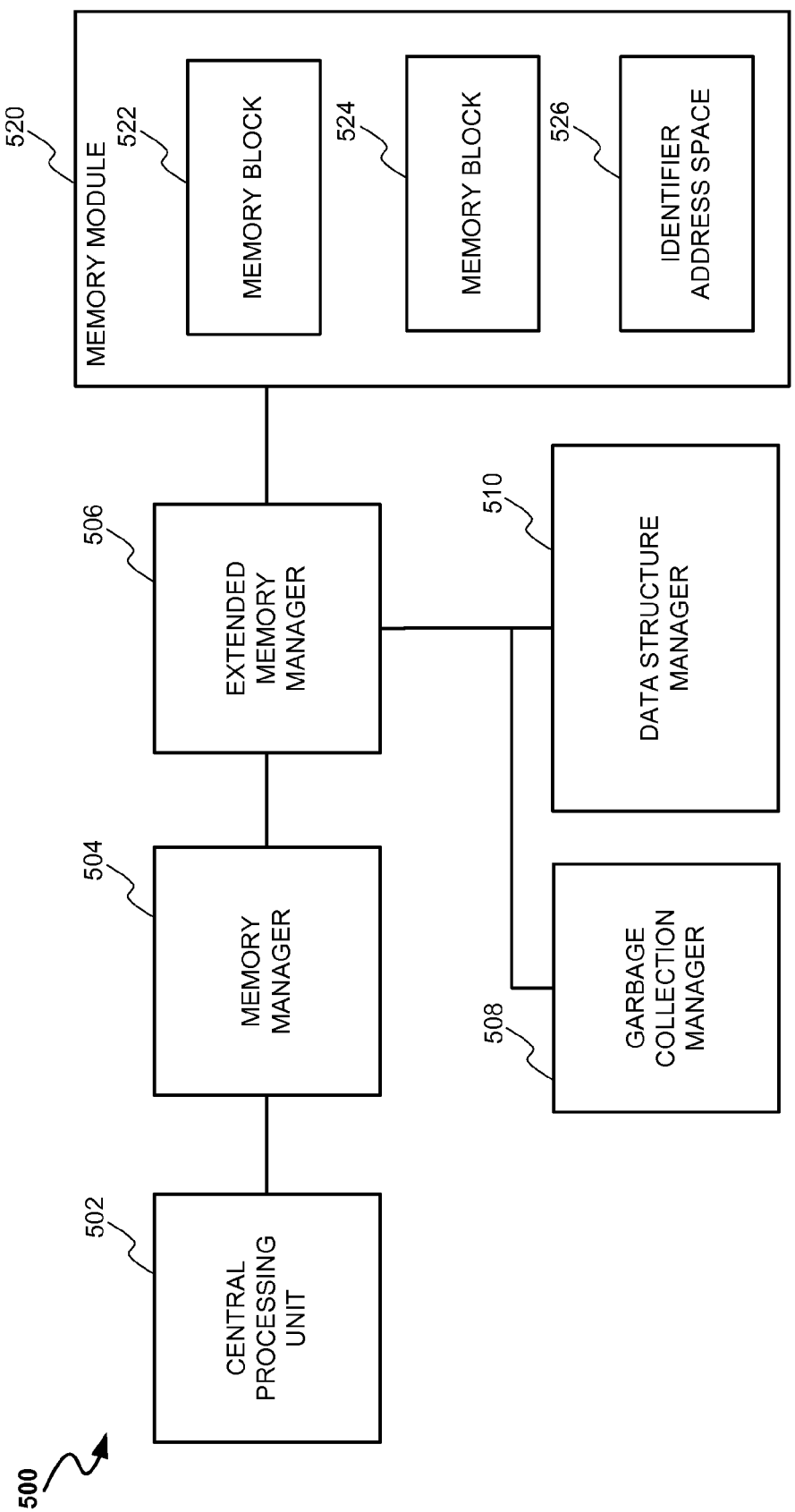
FIG. 5 is a block diagram of a system for garbage collection useful for implementing the invention according to an embodiment of the invention.

FIG. 5 is a block diagram of a system 500 for garbage collection useful for implementing the invention according to an embodiment of the invention. During an object generation phase, central processing unit (CPU) 502 sends a memory allocation request to memory manager 504 for allocation of an amount of memory in memory module 520 to an object typically for use in a computer program. Memory manager 504 is generally responsible for allocation of the memory to objects. The amount of memory allocated to the object is generally determined by the computer program at the time of allocation and need not be known in advance. Memory module 520 typically includes one or more memory blocks 522 and 524. According to an embodiment, memory manager 504 allocates the memory to object only in memory block 522. No allocation of memory is allowed in memory block 524. Allocation of the memory typically includes allocation of a set of memory locations in memory module 520. The number of memory locations allocated to an object is decided by memory manager 504 based upon the request received from CPU 502. Memory module 520 may include any physical memory such as a random access memory (RAM). CPU 502 typically requests for the memory by way of virtual addresses. It is the responsibility of memory manager 504 to allocate physical memory in memory module 520 and perform translations from virtual addresses to physical addresses on each access to the memory locations allocated in memory module 520.

The memory allocation requests are typically forwarded by memory manager 504 to extended memory manager 506. Extended memory manager 506 generates a unique object identifier for each object that is allocated an amount of memory in memory module 520. In an embodiment, the object identifiers generated for objects are stored in identifier address space 526. Identifier address space 526 may reside either in memory module 520 or in extended memory manager 506. In an embodiment identifier address space 526 is not directly accessible by either CPU 502 or memory manager 504 to prevent potential allocation of memory and overwriting in the identifier address space. On receipt of a memory allocation request for an object from CPU 502, extended memory manager 506 typically generates an object identifier for the object and sends the object identifier back to CPU 502. Subsequent requests for access to the memory allocated to the object are made by CPU 502 by providing the object identifier of the object.

Garbage collection manager 508 generates a translation table storing the object identifiers of the objects and the corresponding memory locations allocated in memory module 520 to each of the objects. A request for access to the memory locations of an object is generally made by CPU 502 by sending the object identifier of the object to extended memory manager 506. Extended memory manager 506 looks up the translation table for the corresponding addresses of the memory locations allocated to the object, extracts the required data from the memory locations and sends the data back to CPU 502. The translation table 110 may either be stored in garbage collection manager 508 or in memory module 520.

Data structure manager 510 typically generates a data structure for each object that has memory allocated in memory module 520. The data structure generally has various fields including a length field, a number field, an address field and a mark flag. The length field stores a length of the memory allocated to an object. The length field typically includes the number of memory locations allocated to the object in memory module 520. The number field stores a number of references that the object makes to other objects. A zero value in the number field indicates that the object has no references to any other objects. The address field typically stores the addresses of the other objects in memory module 520 referenced by the object. The mark flag may either be set to zero or one. The data structure may either be stored in data structure manager 510 or memory module 520.

In a garbage collection cycle, garbage collection manager 508 initiates a garbage collection in memory module 520. Garbage collection is typically initiated by garbage collection manager 508 when memory block 522 is fully allocated for various objects and no more memory space is left for further allocation of objects. Upon initiation of garbage collection, garbage collection manager 508, in a mark cycle reads the data structure of each object that has memory allocated in memory block 522. Data structure manager 510 sets the mark flag of the data structure of an object to zero if the number field of the data structure of the object is zero. Data structure manager 510 sets the mark flag of the data structure to one if the number field of the data structure of the object is greater than zero. In an embodiment, garbage collection manager 508 reads the data structure of the objects starting from the first object listed in the translation table till the last object listed in the translation table.

On setting the mark flag of an object, garbage collection manager 508, in a sweep cycle, typically reads the length field of the data structure of the object to find out the number of memory locations allocated to the object starting from the first memory location allocated to the object. If the mark flag in the data structure of the object is set to one, the data stored in all the memory locations allocated to the object is moved to memory block 524. The translation table is subsequently updated with the addresses of the new memory locations allocated to the object in memory block 524. If the mark flag in the data structure of the object is set to zero, the data stored in all the memory locations allocated for the object is deleted from memory block 522. The address space left vacant in memory block 524 upon deletion of the object is made available to memory manager 504 for further allocation to new objects. In an embodiment, garbage collection management starts a sweep cycle for the objects only after a mark cycle for all the objects is finished.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium is an article of manufacture and may include, but is not limited to, flash memory, optical disks, CD-ROMs, DVD ROMs, RAMs, EPROMs, EEPROMs, magnetic or optical cards, other type of machine-readable media suitable for storing electronic instructions. For example, the invention may be downloaded as a computer program which may be transferred from a remote computer (e.g., a server) to a requesting computer (e.g., a client) by way of a communication link (e.g., a modem or network connection).

What is claimed is:

1. A computerized method for garbage collection, comprising:

receiving a memory allocation request from a central processing unit for an object, wherein memory allocation includes allocation of a set of memory locations in a memory unit;

generating an object identifier for the object on receipt of the memory allocation request, the object identifier stored in a separate address space from the object;

allocating a first memory location to the object in the memory unit;

a garbage collection manager, generating a translation table comprising a map of the object identifier and the first memory location;

generating a data structure for the object, wherein the data structure includes a length field, a number field, an address field and a mark flag;

setting the mark flag based on a number of references from the object to other objects specified in the number field;

moving data stored in the first memory location in the memory unit to a second memory location in the memory unit based upon a value of the mark flag indicating that the object has a reference to a second object, based on the number field; and deleting the data from the first memory location based upon the value of the mark flag indicating that the object has no references to the other objects, based on the number field.

2. The method of claim 1, wherein the number field comprises the number of references of the object to the other objects.

3. The method of claim 2, wherein the number of references comprises a second reference from the second object to the object and the reference from the object to the second object.

4. The method of claim 1 further comprising updating the translation table after moving the data from the first memory location to the second memory location.

5. The method of claim 1 further comprising:
searching the translation table to find the second memory location corresponding to the object identifier; and
retrieving the data from the second memory location.

6. The method of claim 1, wherein the object identifier is a virtual address.

7. The method of claim 1, wherein setting the mark flag comprises;
setting the mark flag if the number of references specified in the number field is greater than zero; and
setting the mark flag to zero if the number of references specified in the number field is zero.

8. The method of claim 1, wherein the data stored in the first memory location is moved to the second memory location if the value of the mark flag is set to one.

9. The method of claim 1, wherein the data stored in the first memory location is deleted if the value of the mark flag is set to zero.

10. A system comprising:
a central processing unit for sending a memory allocation request;
a memory unit in communication with the central processing unit, the memory unit divided into one or more memory blocks that provide memory allocation;
a memory manager for allocating a first memory location to an object in the memory unit;
an extended memory manager electronically coupled to the memory manager for generating an object identifier for the object upon receipt of the memory allocation request from the central processing unit, the object identifier stored in a separate address space from the object;
a data structure manager electronically coupled to the extended memory manager for generating a data structure for the object and setting a mark flag based on the number of references from the object to other objects specified in a number field;
a garbage collection manager electronically coupled to the extended memory manager and the data structure manager for generating a translation table storing a map of the object identifier and the first memory location, the garbage collection manager moving data stored in the first memory location to a second memory location upon a value of the mark flag indicating that the object has a reference to a second object or deleting the data from the first memory location based upon a value of the mark flag indicating that the object has no references to the other objects, based on the number field.

11. The system of claim 10 further comprising a memory module electronically coupled to the extended memory manager for storing the first memory location and the second memory location.

12. The system of claim 10, wherein the data structure comprises a length field, the number field, an address field and the mark flag.

13. The system of claim 12, wherein the number field comprises the number of references from the object to the other objects.

14. A tangible machine-readable storage medium that provides instructions that, when executed by a machine, cause the machine to perform operations comprising:
receiving a memory allocation request for an object;
generating an object identifier for the object on receipt of the memory allocation request, the object identifier stored in a separate address space from the object;
allocating a first memory location to the object;
generating a translation table for storing a map of the object identifier and the first memory location;
generating a data structure for the object, wherein the data structure includes a length field, a number field, an address field and a mark flag;
setting the mark flag based on a number of references from the object to other objects specified in the number field;
moving data stored in the first memory location to a second memory location based upon a value of the mark flag indicating that the object has a reference to a second object, based on the number field; and
deleting the data from the first memory location based upon the value of the mark flag indicating that the object has no references to the other objects.

15. The machine-readable storage medium of claim 14, wherein the number field comprises the number of references of the object to the other objects.

16. The machine-readable storage medium of claim 14 further providing instructions which when executed by the machine cause the machine to perform further operations comprising updating the translation table after moving the data from the first memory location to the second memory location.

17. The machine-readable storage medium of claim 14 further providing instructions which when executed by the machine cause the machine to perform further operations comprising:
searching the translation table to find the second memory location corresponding to the object identifier; and
retrieving the data from the second memory location.

18. The machine-readable storage medium of claim 14, wherein setting the mark flag comprises:
setting the mark flag if the number of references specified in the number field is greater than zero; and
setting the mark flag to zero if the number of references specified in the number field is zero.

* * * * *